US009282304B1

(12) United States Patent
Schmit et al.

(10) Patent No.: US 9,282,304 B1
(45) Date of Patent: Mar. 8, 2016

(54) FULL-COLOR IMAGES PRODUCED BY WHITE-LIGHT INTERFEROMETRY

(71) Applicants: Joanna Schmit, Tucson, AZ (US); Florin Munteanu, Tucson, AZ (US)

(72) Inventors: Joanna Schmit, Tucson, AZ (US); Florin Munteanu, Tucson, AZ (US)

(73) Assignee: BRUKER NANO INC., Santa Barbara, CA (US)

( * ) Notice: Subject to any disclaimer, the term of this patent is extended or adjusted under 35 U.S.C. 154(b) by 57 days.

(21) Appl. No.: 14/293,662

(22) Filed: Jun. 2, 2014

(51) Int. Cl.
| H04N 7/18 | (2006.01) |
| H04N 5/228 | (2006.01) |
| H04N 9/73 | (2006.01) |
| G01B 9/02 | (2006.01) |
| H04N 9/07 | (2006.01) |

(52) U.S. Cl.
CPC ............ *H04N 9/735* (2013.01); *G01B 9/02041* (2013.01); *H04N 9/07* (2013.01)

(58) Field of Classification Search
CPC .. G02B 21/365; G02B 21/367; G02B 21/002; H04N 7/18; G01N 21/6458; G01B 11/2441; G01B 9/0209
See application file for complete search history.

(56) References Cited

U.S. PATENT DOCUMENTS

| 5,398,113 | A | * | 3/1995 | de Groot | G01B 11/2441 356/497 |
| 5,614,961 | A | * | 3/1997 | Gibeau | G02B 26/10 348/203 |
| 7,095,503 | B2 | | 8/2006 | Kim et al. | |
| 7,317,540 | B1 | | 1/2008 | Kim et al. | |
| 8,004,688 | B2 | | 8/2011 | Davidson et al. | |
| 8,300,233 | B2 | | 10/2012 | Deck et al. | |
| 8,379,218 | B2 | | 2/2013 | Deck et al. | |
| 2013/0155413 | A1 | | 6/2013 | Liesener et al. | |
| 2014/0043474 | A1 | * | 2/2014 | Westphal | G01N 21/55 348/136 |
| 2014/0226150 | A1 | * | 8/2014 | Colonna de Lega | G01B 9/02007 356/73 |
| 2015/0054937 | A1 | * | 2/2015 | Lippert | G02B 21/0028 348/80 |

* cited by examiner

*Primary Examiner* — Jason Flohre
*Assistant Examiner* — Selam Gebriel
(74) *Attorney, Agent, or Firm* — Antonio R. Durando

(57) ABSTRACT

A true-color image of a sample is obtained from interference data captured with a color camera. The irradiance of each color on the respective photo-sensor represents the sum of DC components received from the object and the reference surface and a modulated interference component. The color is determined at each pixel by removing the interference component and the reference-surface component from the irradiance data. The color map so derived is then combined with the height map produced with the same data to yield a true-color 3D map of the sample.

26 Claims, 9 Drawing Sheets

FULL-COLOR IMAGES PRODUCED BY WHITE-LIGHT INTERFEROMETRY

BACKGROUND OF THE INVENTION

1. Field of the Invention

The invention relates in general to white-light interferometry. In particular, it relates to a new approach for producing microscope-like color images from interferometric data.

2. Description of the Related Art

The desirability of high-precision color images has been increasingly felt in various arts because of the structural and compositional information provided by color. For example, the boundary between different materials can be observed more readily if a sample is imaged sharply and in color. To that end, bright-field white-light microscope images can be improved by scanning through focus the sample surface to obtain the sharpest possible local in-focus images which are then combined to produce an improved color image of the surface. In addition, the scan data can be used to determine the vertical position of each local focal plane, which in turn also enables the three-dimensional color image representation of the sample.

While images produced by bright-field microscopy have the advantage of true color representation, they are limited with regard to the precision of the height measurements derived from through-focus scanning. Therefore, interferometric approaches, which can determine heights with nanometer precision, have gained much acceptance where accurate three-dimensional representations are required. The problem, however, has been that the irradiance data provided by interferometric measurements is not directly suitable for color images because of the effects of interference and the contribution of reference-mirror light to the wavefront detected by the camera. In fact, until recently, the main objective of interferometric measurements was simply the precise three-dimensional mapping of samples and color was typically used arbitrarily only to highlight structural variations, not to show true color.

Imaging of true color has now become an important aspect of interferometric profiling, especially in the fields of biology and pathology, where color as well as structure provides a great deal of visual information to the trained observer. Accordingly, much effort has been devoted to obtaining color images that represent the sample with the high precision afforded by interferometric measurements. For example, one approach has been to provide a 3-D interferometric objective and a bright-field objective in the same instrument to produce both height and color data through independent measurements that are then combined to obtain a high-precision 3-D color image. However, this approach requires two separate measurements, a process that lengthens the data acquisition time beyond what may be acceptable for certain applications.

In Japanese Patent Application No. 2010-112865, Yamauchi Takashi describes an interferometric color-imaging approach based on the usage of either a monochromatic or an RGB (red-green-blue) color camera. Three light sources (RGB, generated either independently or through filtered white light) are sequentially activated at three separate scan times at each interferometric acquisition frame so as to generate simultaneously interferometric data for each color from which the relative height of each pixel is determined. The interference effect is then removed from the data to provide true RGB color information that is combined with the height data to produce a full-color interferometric 3-D image. Since both height and color are generated by the same measurement, the procedure is precise and faster than what could be attained by combining microscope and interferometer data.

A similar approach is described by T. Machleidt et al. in a publication entitled "Application of Color Cameras for 3D Surface Measurements with White Light Interferometers" presented by the German company GBS GmbH at the 14th SpectroNet Collaboration Forum in Jena Germany. Using individual RGB interferometric data generated with white light detected with a color camera, the sets of color modulation data recorded for each pixel (in so-called Bayer pattern) are spectrally reconstructed and correlated to derive true-color approximations. These are then combined with the height measurements to produce full-color 3-D representations of the sample surface.

The present invention addresses the same problem with a simplified approach for producing in a rapid and computationally efficient manner a full-color interferometric image of a sample surface. The procedure is based on the mathematical representation of the irradiance produced by interferometry.

BRIEF SUMMARY OF THE INVENTION

The method of the invention is carried out with a conventional white-light-interferometry (WLI) instrument fitted with a color (RGB) camera. WLI is well known in the art; therefore, it will not be described here other than in the context of the procedure of the invention. When interferometric data are collected with an RGB camera, fringes with a modulation envelope are generated by each of the red, green and blue wavelengths at each pixel, as illustrated in FIG. 1. (For clarity, in order to retain a one-to-one correspondence between camera and object pixels, the term pixel is intended to correspond to four photo-sensors in Bayer pattern.) The peak of modulation, used in conventional manner to calculate the relative height of the pixel (such as by the center-of-mass technique described in U.S. Pat. No. 5,633,715) will be substantially at the same Z scanning position. The objective of the invention is to extract substantially true colors from the modulation data of FIG. 1.

The irradiance of each color on the respective photo-sensor of the RGB camera can be described, as a function of scanner position z, by the following equation:

$$I^{RGB}(z) = I_{obj}^{RGB} + I_{ref}^{RGB} + g^{RGB}(z)\sqrt{I_{obj}^{RGB} I_{ref}^{RGB}} \cos\left(\frac{2\pi}{\lambda}z + \varphi\right), \quad (1)$$

where $I_{obj}^{RGB}$ represents the red, green or blue wavefront intensity returned by the sample, $I_{ref}^{RGB}$ represents the red, green or blue wavefront intensity returned by the reference mirror, $g^{RGB}(z)$ is the signal modulation function associated with the objective and light source used by the white-light interferometer, $\lambda$ is average wavelength and $\varphi$ is phase. The value of z varies linearly with the physical separation between the sample and the reference mirror (i.e., scanner motion), while the phase $\varphi$ is introduced by the relative height of each sample pixel with respect to the reference plane.

According to the invention, Equation 1 is solved and red, green or blue wave-front irradiance, $I_{obj}^{RGB}$, is identified at every pixel. Once so determined, the red, green and blue irradiances returning from the sample object are combined to obtain an accurate color image of the pixel. This is accomplished for each pixel by first removing the interference term $$g^{RGB}(z)\sqrt{I_{obj}^{RGB} I_{ref}^{RGB}} \cos\left(\frac{2\pi}{\lambda}z + \varphi\right)$$

and then subtracting the irradiance $I_{ref}^{RGB}$ returned by the reference mirror. These steps are performed for every pixel and each of the three recorded wavelengths (R, G, B). Once a color map is so generated, the color for each pixel at its best focus is combined with the height map calculated in conventional manner from the interference data to obtain a full-color 3-D image of the sample.

According to another aspect of the invention, the DC component of Equation 1 is obtained directly for each color from measurement data acquired away from focus; that is, in scan zones outside the coherence of the light source or sources. The reference mirror contribution to the DC component $I_{ref}^{RGB}$, is then subtracted to obtain the object contribution to the color wavefront irradiance, $I_{obj}^{RGB}$. This approach (as well as the general one described in the previous paragraph) can be further simplified by using a low-reflection reference mirror or a beam splitter that reduces the relative intensity of the reference beam, thereby minimizing the reference-mirror contribution to the interference beam detected at the camera. In such case, irradiance measurements acquired outside the coherence envelope of the interferogram (i.e., away from focus, as in the case above) may, with no further processing, provide images of acceptable color quality for particular applications.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE PREFERRED EMBODIMENT OF THE INVENTION

The general idea of the invention is to obtain a color map of a sample object from interferometric data by removing the contribution of interference fringes and of the reference mirror signals from the irradiance detected by a color camera. The resulting irradiance component at each pixel corresponds substantially to a bright-field signal received from the sample, from which a substantially true-color map can be composed, especially from in-focus data frames. For the purposes of this description, the terms true-color and full-color are used interchangeably to indicate an image having the color quality of an image produced by a conventional bright-field microscope. The terms reference surface and reference mirror are both used to refer to the reflective unit in the reference arm of an interferometer. Similarly, the terms sample, object and sample object are used equivalently, as is normal in the art, with regard to the arm of the interferometer directed to the measured surface. White light is intended to refer to a wavefront of sufficient wavelengths to represent fairly the true color of the sample object. As such, the term white light, as used in the description as well as in the claims of the invention, is intended to cover also multiple single-color wavefronts from different sources, if detected by a color camera and processed according to the invention. Finally, the terms beam and wavefront are used interchangeably throughout.

Figure 1:
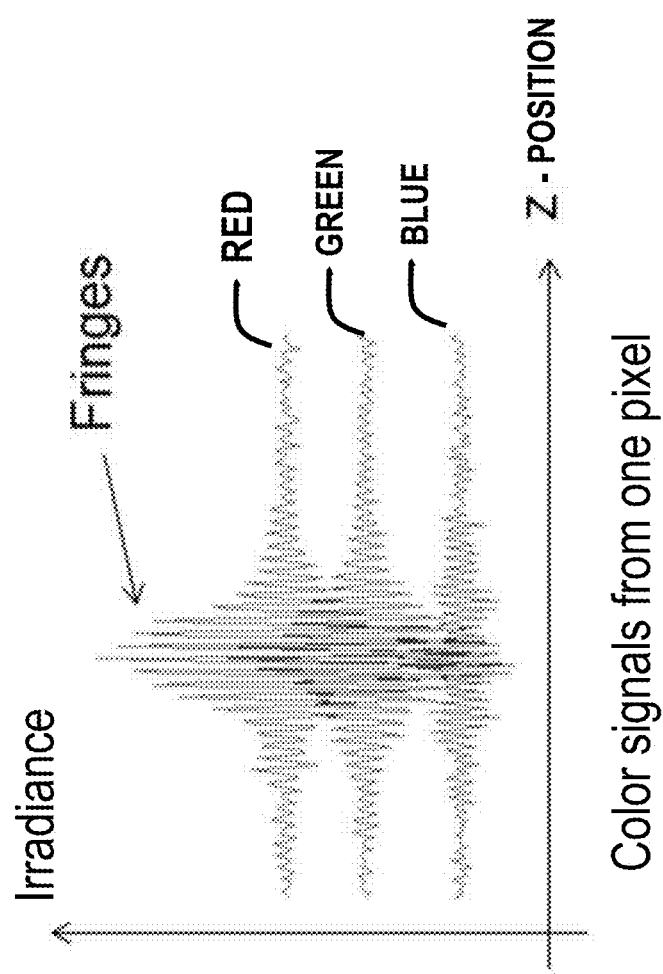
FIG. 1 is an illustration of typical modulation envelopes (fringes) obtained recording interferometric irradiance with a color RGB camera.

The removal of the interference term $$g^{RGB}(z)\sqrt{I_{obj}^{RGB} I_{ref}^{RGB}} \cos\left(\frac{2\pi}{\lambda}z + \varphi\right)$$

can be accomplished in different ways. From FIG. 1 it can readily be seen that a simple and fast approach consists of estimating the value of the average irradiance of the signal across all or a portion, such as through focus, of the sampled points along the scan. The value obtained in this manner approaches the sum of the irradiance received from the sample object and from the reference mirror (i.e., the value of $I_{obj}^{RGB} + I_{ref}^{RGB}$). Equivalently, as is known in the art, the value of the interference term can also be determined as the first term (the DC term) of a Discrete Fourier Transform (DFT) of the recorded signal at each pixel.

Both these methods yield acceptable results. However, the preferred implementation consists of filtering the irradiance signal with a conventional low-pass filter considered optimal for the application. While many such FIR (Finite Impulse Response) or IIR (Infinite Impulse Response) filters are known, the five-point FIR filter {0.125, 0.25, 0.25, 0.25, 0.125} commonly used in the art has been found to be appropriate for the purposes of the invention. This filter is adequate when the irradiance data are acquired at $$\frac{\pi}{2}$$

intervals, which is probably the most common technique used in scanning interferometry. As those skilled in the art will readily recognize, the number of points used for filter construction can be selected arbitrarily large, in accordance with the desired performance and data characteristics. The five-point filter of Equation 2 was found to be sufficiently precise for the purposes of the invention.

After the fringe removal procedure, the resulting irradiance, the DC component of the irradiance signal, is represented by the sum of the object and reference mirror reflected intensities.

$$I_{DC}^{RGB}(z) = I_{obj}^{RGB} + I_{ref}^{RGB}, \qquad (2)$$

where the subscript DC refers to the unmodulated signal. The next step requires removal of the beam intensity returned by the reference mirror, $I_{ref}^{RGB}$. In the most simplistic implementation, the determination of the signal returned by the reference mirror $I_{ref}^{RGB}$ can be measured a priori and stored. For example, if the data are collected from a black (non-reflective) object, the irradiance measured by the camera is close to the actual intensity of the signal returned just by the reference mirror. However, while this approach might be sufficiently precise and therefore appropriate for some applications, it is not preferred. The preferred approach is based on the explicit determination of the value of $I_{ref}^{RGB}$ by combining Equation 2 with an expression for the modulating envelope of fringes, $M^{RGB}(k)$, from Equation 1. Explicitly, at each data acquisition frame "k" recorded by the color camera and for each color, the following set of equations is solved for each pixel:

$$\begin{cases} I_{DC}^{RGB}(k) = I_{obj}^{RGB} + I_{ref}^{RGB} \\ M^{RGB}(k) = g^{RGB}(k)\sqrt{I_{obj}^{RGB} I_{ref}^{RGB}} \end{cases} \qquad (3)$$

However, because the system of Equations 3 contains two equations and three unknowns ($I_{obj}^{RGB}$, $I_{ref}^{RGB}$, $g^{RGB}(k)$), we choose to select the function $g^{RGB}(k)$ such that it represents a scaled version of the calculated modulation envelope $M^{RGB}(k)$. This decision is supported by analogy with the standard two-wave interference situation for which the measured irradiance can be written as: $I(z) = \int |\sqrt{I_1(z)} \sin[\omega t + \phi_1(z)] + \sqrt{I_2(z)} \sin[\omega t + \phi_2(z)]|^2 dt = I_1(z) + I_2(z) + 2\sqrt{I_1(z)I_2(z)} \cos[\phi_1(z) - \phi_2(z)]$, where z is scanner position. Based on this relationship, in addition to the requirement that $g^{RGB}(k)$ be proportional to $M^{RGB}(k)$, the requirement that the maximum value of $$\frac{1}{2} g^{RGB}(k)$$

be equal to one is also imposed based on the aforementioned analysis. The envelope modulation $M^{RGB}(k)$ can be computed by many standard procedures. For example, using the algorithm developed by Larkin (K. G. Larkin "Efficient non-linear algorithm for envelope detection in white light interferometry", J. Opt. Soc. Am. A/Vol. 13, No. 4/April 1996), the value of the modulation can be expressed in terms of five consecutive points, as follows:

$$M(k) \sim [(I_{k+1} - I_{k-1})^2 - (I_{k+2} - I_k)(I_k - I_{k-2})]^{1/2} \qquad (4)$$

where k is data acquisition frame. Once the value of $M^{RGB}(k)$ has been determined for each frame k, the expression for $g^{RGB}(k)$ becomes $$g^{RGB}(k) = \frac{2M^{RGB}(k)}{\max(M^{RGB}(k))} \qquad (5)$$

which enables the solution of the system of Equations 3 for $I_{ref}^{RGB}$ and $I_{obj}^{RGB}$. With this selection it is easy to see that at the frame k0 (i.e, k=0), for which the maximum envelope is obtained, the interference term satisfies the standard two-wave interference equation:

$$M^{RGB}(k0) = 2\sqrt{I_{obj}^{RGB} I_{ref}^{RGB}} \qquad (6)$$

Figure 2:
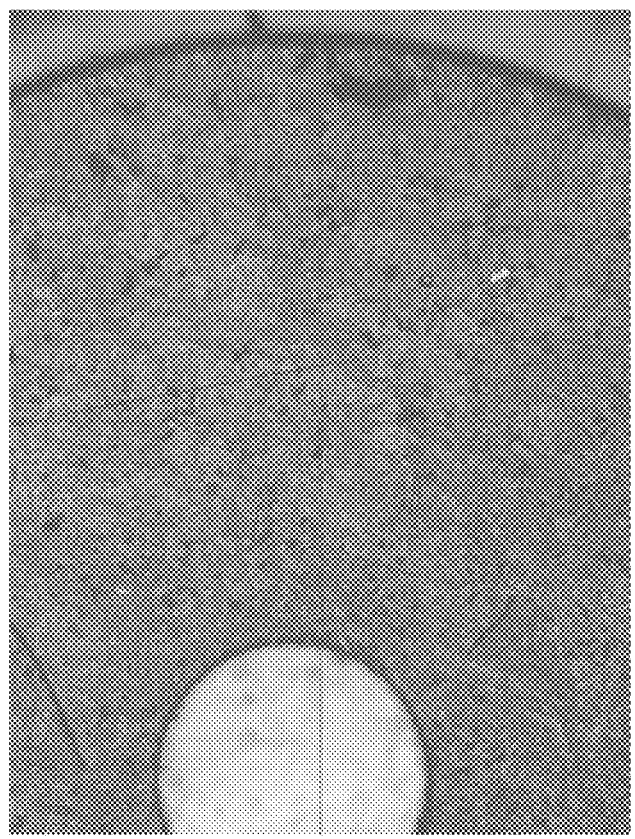
FIG. 2 shows for reference the grayscale version of a two-dimensional bright-field image of a metallic sample captured with a bright-field microscope objective.
Figure 3:
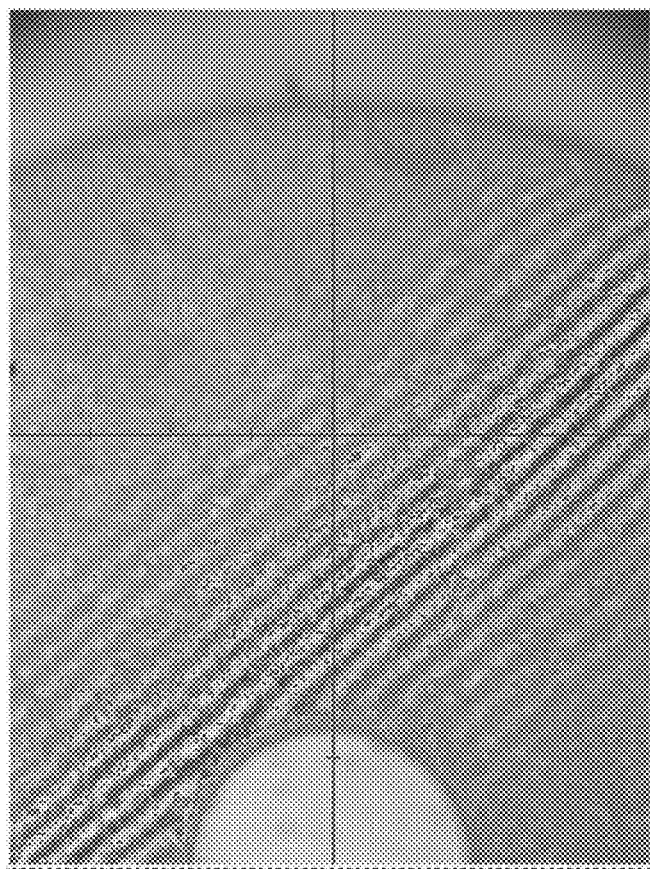
FIG. 3 shows the grayscale version of a color image with fringes generated by white-light interference data from the same sample of FIG. 2.
Figure 4:
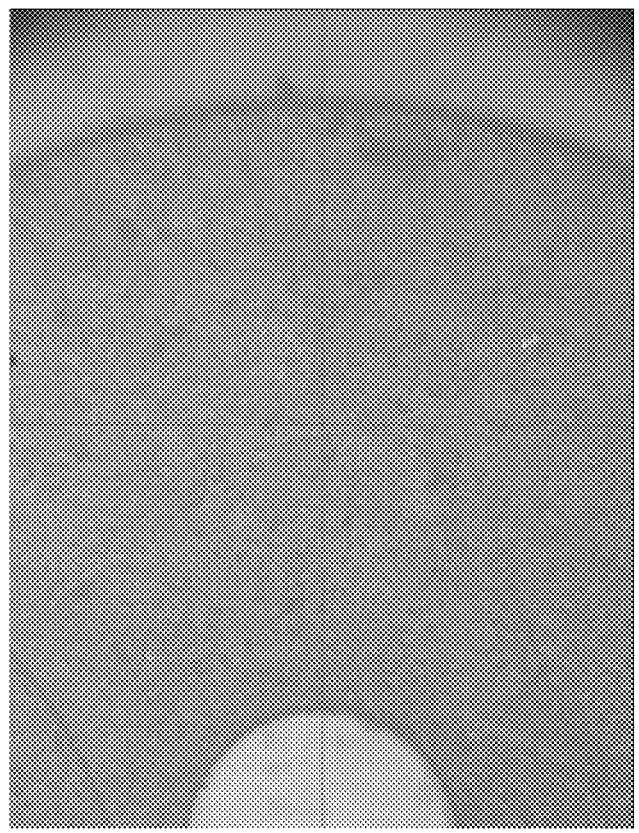
FIG. 4 illustrates the grayscale version of the two-dimensional color image obtained according to the invention from the interference data of FIG. 3 without any additional color enhancement.
Figure 5:
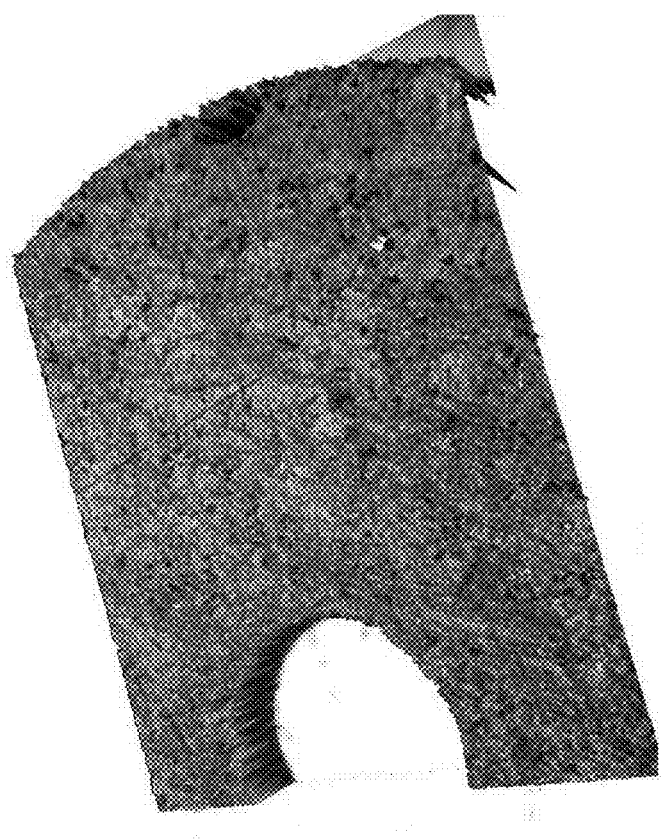
FIG. 5 shows a high-precision three-dimensional grayscale view of the sample of FIG. 3 obtained with the combined interferometric height and color measurements of the invention.

Once the value of $I_{obj}^{RGB}$ is known for each pixel, a color map of the sample is available for combination with the height map of the sample calculated from the same interference data to produce a three dimensional color map with the quality of a bright-field microscope. FIG. 2 shows in grayscale the two-dimensional color image of a metallic sample captured with a bright-field microscope objective. FIG. 3 shows in grayscale the color picture generated by white-light interference data from the same sample. FIG. 4 illustrates in grayscale the two-dimensional color image obtained according to the invention from the interference data of FIG. 3 with no further color enhancement. As can be seen by comparing FIGS. 2 and 4, the invention produces a good representation of a true-color image from interferometric data. Finally, FIG. 5 shows in grayscale a high-precision three-dimensional color view of the sample of FIG. 3, which further illustrates the advantages of the invention.

Those skilled in the art understand that digital color images can be enhanced and manipulated in many ways to highlight features that may be most important for the application at hand. For example, for samples having poor reflectivity, the image may be enhanced by the use of a high numerical-aperture objective, or by the use of a beam splitter passing a much larger than normal fraction of the source beam to the object than to the reference surface (i.e., an 80-20 splitter).

A well known method for enhancing images generated from surfaces having low reflectivity is by means of so-called side illumination. A separate source of white light is used to illuminate the sample directionally from outside the interferometric objective, such as from a side, all sides, from all around, at different angles, diffusively, and so on. In any such case, the light irradiated at the detector will be $$I^{RGB}(z) = I_{obj}^{RGB} + I_{ref}^{RGB} + I_{side}^{RGB} + g^{RGB}(z)\sqrt{I_{obj}^{RGB} I_{ref}^{RGB}} \cos\left(\frac{2\pi}{\lambda} z + \varphi\right), \qquad (6)$$

where $I_{side}^{RGB}(z)$ is the contribution received from the object as a result of the additional illumination. Such side illumination has been found to contribute advantageously to color detection based on the DC component interferometric irradiance when low-reflectivity samples are involved. Therefore, the practice is preferred in such cases.

Another approach for color enhancement is based on white balance calibration (that is, the scaling of R, G, B irradiance to that of neutral—white—objects so that objects believed to be neutral appear so). For bright field objectives the calibration is normally done on a white area of the sample observed by the objective. For interferometric objectives, the calibration is typically done using high illumination and a preferably tilted black and rough felt as the object. Under such conditions, the detector is calibrated so as to register the same signal values for R, G and B at each pixel. The reference mirror typically has a fairly flat reflectance throughout the spectrum and setting it to perfectly white only slightly affects the color of the sample. The result is a clearer color picture for low reflective samples as the contribution from the reference mirror is only white color, which simplifies the reference mirror contribution calculation. As one skilled in the art would readily understand, additional color balancing on the sample color can be done as well after color retrieval from the interferometric data.

Figure 6:
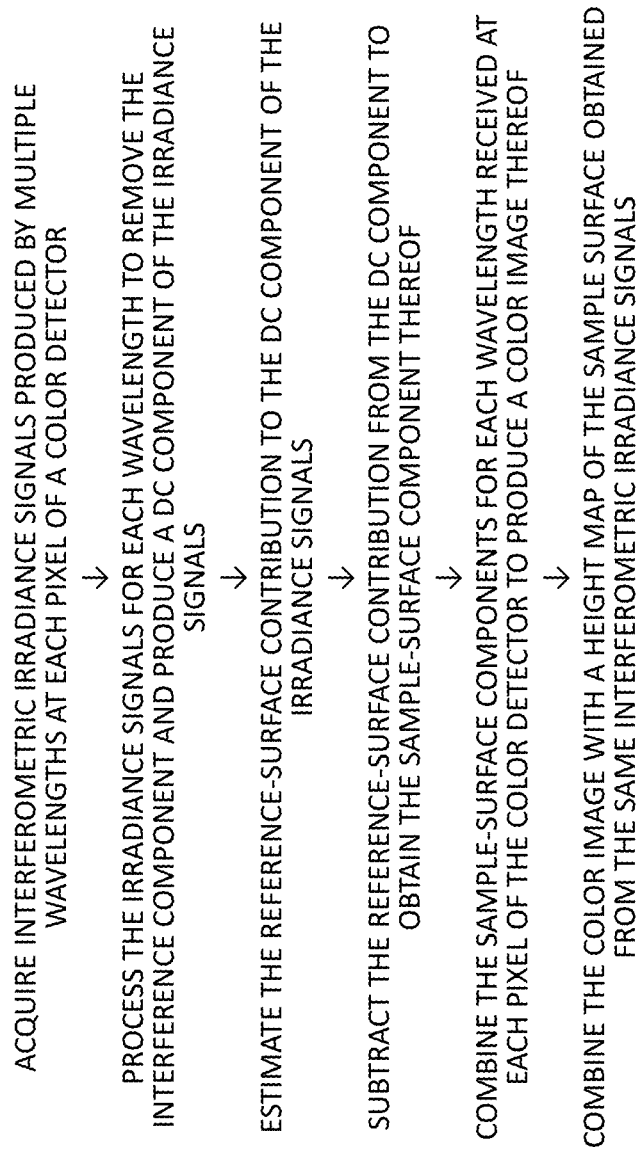
FIG. 6 is a flow-chart of the steps involved in the preferred method of the invention.
Figure 7:
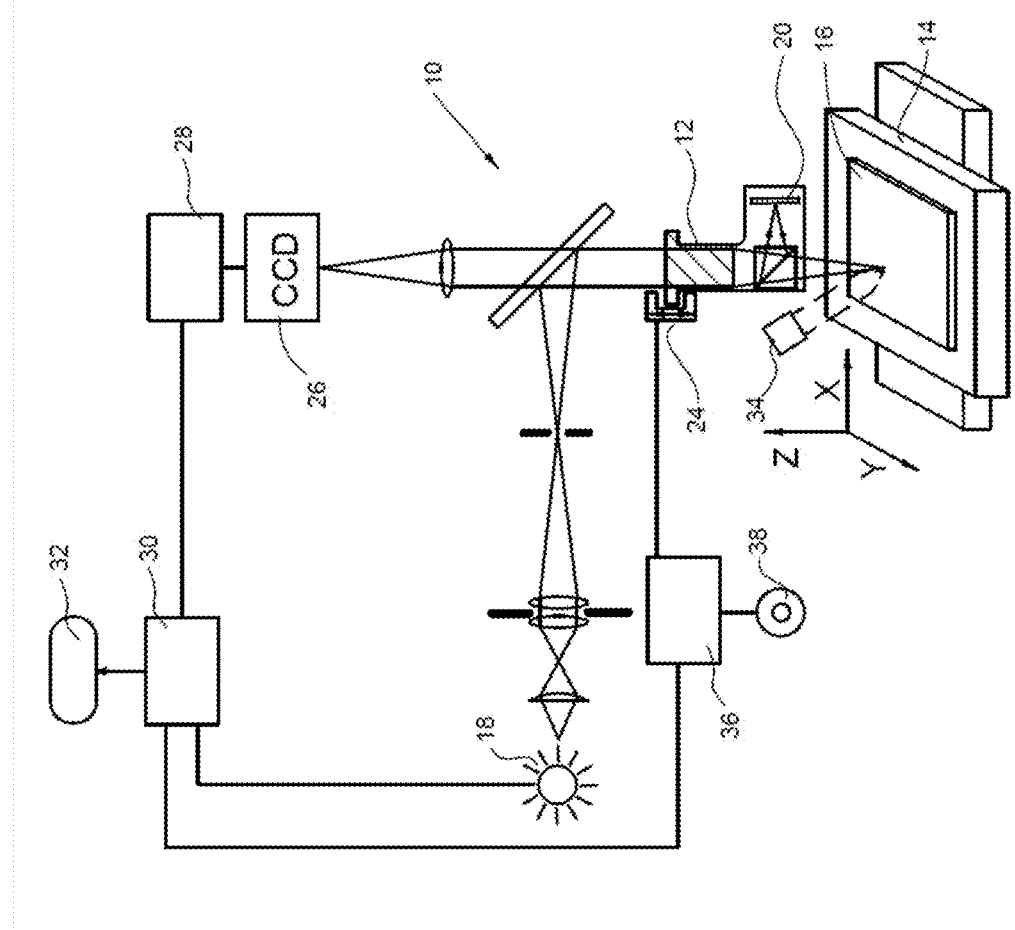
FIG. 7 is a schematic representation of apparatus suitable for carrying out the procedure of the invention using conventional interferometric instrumentation with the addition of side illumination and a computer programmed to perform the required steps.

Thus, a numerical approach has been disclosed for obtaining full-color three dimensional images of a sample with white-light interferometric data. The technique produces images with the height precision afforded by interferometric measurements and the color quality of bright-field microscopy. FIG. 6 is a flow-chart of the basic steps involved in the procedure of the invention. FIG. 7 is a schematic representation of the apparatus required to carry out the procedure using conventional interferometric instrumentation, including an additional light source for optional side illumination, and a computer with non-transitory computer-readable medium programmed to perform the steps of the invention. The Z-scanning interferometer 10 includes with a microscope objective 12 and a sample stage 14 capable of relative translation in the X and Y plane to acquire images of a sample surface 16. The interferometer comprises a light source 18 (which can be white light source or comprise multiple independent narrowband sources, such as R, G and B) illuminating a reference mirror 20 and the sample surface 16 through the microscope objective 12. A suitable focusing mechanism 24 is provided to place the sample surface in focus and to track the height changes of the sample surface as the objective scans it so as to keep the sample in focus following any X-Y translation during the measurement. Combining the light beams generated in reflection from the mirror and the sample surface, interference fringes are produced as a result of the optical path difference between the two beams generated by the vertical scan. A detector 26 (a color camera or multiple cameras, each for detection of a color) and appropriate electronic components 28 are provided to acquire and transmit digitized irradiance data and for further processing by electronic apparatus, such as a computer 30 and an image display device 32. For the purposes of the present invention the interferometer is also equipped with an additional light source 34 for side illumination as described above. The intensity of the light sources 18 and 34 can be varied precisely by controlling the level of power input to them. A controller 36 is connected to the computer 30 and the focusing mechanism 24 for bringing the sample surface 16 into focus prior to the vertical scan. The controller 36 is adapted for automated operation through the computer 30 and for manual operation via a joy stick or similar device 38 in response to information displayed for a user on the monitor 32. Appropriate software is provided to enable processing according to the invention, as detailed above and below.

Figure 8:
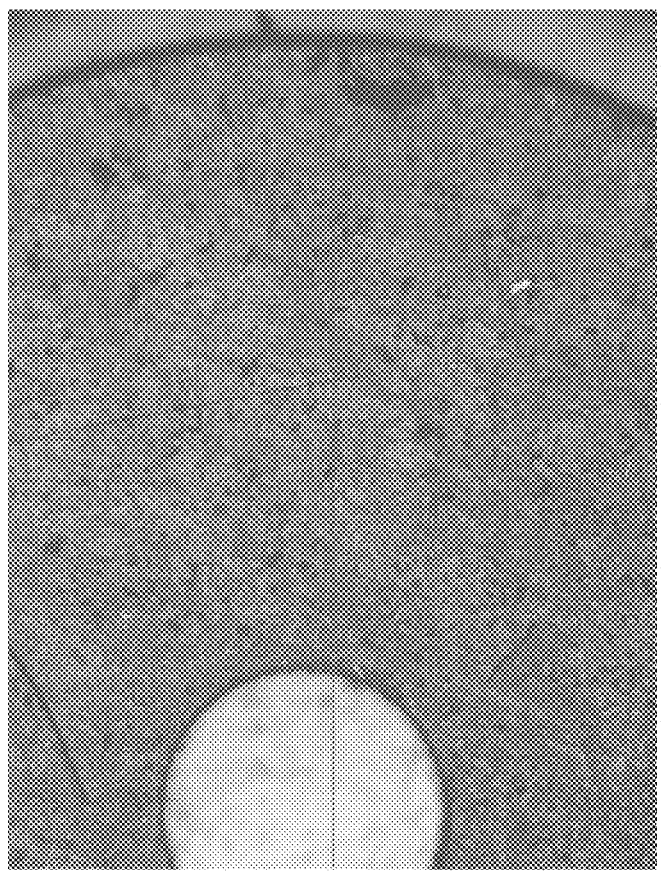
FIG. 8 illustrates the grayscale version of the two-dimensional color image obtained according to a simplified version of invention from the sample of FIG. 2.

One skilled in the art would recognize that the approach of the invention can be simplified in ways that may be useful for certain applications. Recognizing that low-coherence light has a modulation envelope that normally does not span over the entire scanning range of the interferometer, it is clear that interference measurements made outside the envelope represent only the DC term of the irradiance detected by the color camera. Accordingly, the first step described above for removing the interference component from the signal becomes redundant and is no longer necessary (in fact, it is achieved by using data obtained outside the interference envelope); thus, the reference-surface contribution can be subtracted directly from the signal as taught above to extract the sample-surface contribution. Any of the methods described above is equally applicable. FIG. 8 illustrates in grayscale a color picture obtained by this simplified approach using off-focus interference data from the same scan that produced the image of FIG. 3 with the addition of conventional color enhancement, as explained above.

Figure 9:
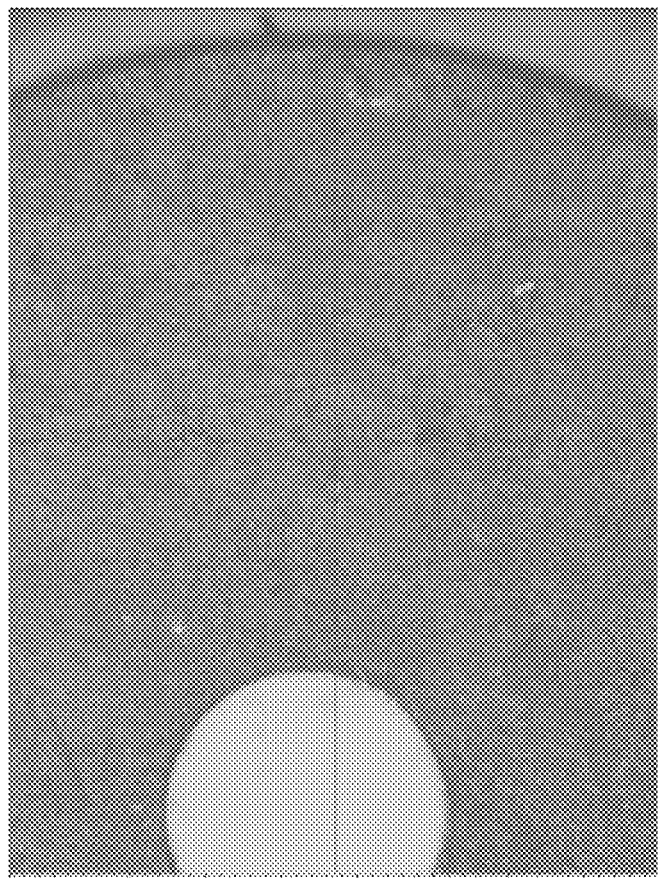
FIG. 9 illustrates in grayscale the two-dimensional color image obtained according to a still simpler version of invention from the sample of FIG. 2.

A yet simpler approach consists of minimizing the reference-surface contribution to the interference signal by either using a very-low-reflectivity reference mirror, such as glass, or by reducing the intensity of the beam transmitted to it in relation to the intensity of the beam transmitted to the sample surface (that is, by reducing the reference-surface contribution to the DC component of the irradiance data in relation to the sample-surface component thereof). The latter can be achieved simply with the proper selection of the beam splitter in the interferometric objective. FIG. 9 illustrates in grayscale a color picture of print on paper obtained by this further-simplified approach using a reference mirror with low reflectivity (silicone carbide, with reflectivity no greater than 50% of the reflectivity of the sample surface) and using off-focus interference data from the same scan that produced the image of FIG. 3.

While the invention has been shown and described herein in what is believed to be the most practical and preferred embodiments, it is recognized that departures can be made therefrom within the scope of the invention. For example, the calculation of $I_{obj}^{RGB}+I_{ref}^{RGB}$ that has been described as optionally carried out with a Fourier Transform technique, could be achieved as well with other methods known in the art, such as wavelet transforms, or various spectral methods designed to identify the harmonic composition of the signal (such as MUSIC™ or ESPRIT®). Therefore, the invention is not to be limited to the details disclosed herein but is to be accorded the full scope of the claims so as to embrace any and all equivalent processes and products.

The invention claimed is:

1. An interferometric method for producing a color image of a sample surface from white-light interference irradiance measurements, the method comprising the following steps:
acquiring irradiance data produced by multiple wavelengths at each pixel of a color detector receiving said interference irradiance;
processing said irradiance data for each of said wavelengths to remove an interference component of the irradiance data and produce a DC component thereof;
estimating a reference-surface contribution to said DC component of the irradiance data;
subtracting said reference-surface contribution from the DC component of the irradiance data to produce a sample-surface component thereof; and
combining said sample-surface component for each of said wavelengths received at pixels of the color detector corresponding to a predetermined area of the sample surface to produce a color image thereof;
wherein said acquiring, processing, estimating, subtracting, and combining steps are carried out with a computer processor.

2. The method of claim 1, further comprising the step of combining said color image with a height map of the sample surface obtained from said interference irradiance measurements.

3. The method of claim 1, wherein said acquiring step is carried out by scanning through focus.

4. The method of claim 1, wherein said processing step is carried out with a Finite Impulse Response filter.

5. The method of claim 1, wherein said processing step is carried out by estimating an average value of said irradiance data.

6. The method of claim 1, wherein said processing step is carried out with a Fourier Transform technique.

7. The method of claim 1, wherein said processing step is accomplished by acquiring said irradiance data off-focus.

8. The method of claim 7, wherein said estimating and subtracting steps are accomplished by reducing said reference-surface contribution to the DC component of the irradiance data in relation to said sample-surface component thereof.

9. The method of claim 1, wherein said estimating and subtracting steps are accomplished by reducing said reference-surface contribution to the DC component of the irradiance data in relation to said sample-surface component thereof.

10. The method of claim 1, wherein said estimating and subtracting steps are accomplished by solving for $I_{ref}^{RGB}$ and $I_{obj}^{RGB}$ a system of equations given by $$\begin{cases} I_{DC}^{RGB}(k) = I_{obj}^{RGB} + I_{ref}^{RGB} \\ M^{RGB}(k) = g^{RGB}(k)\sqrt{I_{obj}^{RGB} I_{ref}^{RGB}} \end{cases},$$

where k is acquisition frame, superscripts R, G and B refer to each of said wavelengths, $I_{DC}$ is said DC component of the irradiance data; and M(k) is estimated by the expression $[(I_{k+1}-I_{k-1})^2-(I_{k+2}-I_k)(I_k-I_{k-2})]^{1/2}$.

11. The method of claim 1, wherein said estimating step is accomplished by measuring said reference-surface contribution to said DC component of the irradiance data a priori and storing it for use in said subtracting step.

12. The method of claim 11, wherein said measuring step is carried out by measuring interference signals collected from a non-reflective object.

13. The method of claim 2, wherein said acquiring step is carried out by scanning through focus.

14. The method of claim 2, wherein said processing step is carried out with a Finite Impulse Response filter.

15. The method of claim 2, wherein said processing step is carried out by estimating an average value of said irradiance data.

16. The method of claim 2, wherein said processing step is carried out with a Fourier Transform technique.

17. The method of claim 2, wherein said processing step is accomplished by acquiring said irradiance data off-focus.

18. The method of claim 17, wherein said estimating and subtracting steps are accomplished by reducing said reference-surface contribution to the DC component of the irradiance data in relation to said sample-surface component thereof.

19. The method of claim 2, wherein said estimating and subtracting steps are accomplished by reducing said reference-surface contribution to the DC component of the irradiance data in relation to said sample-surface component thereof.

20. The method of claim 2, wherein said estimating and subtracting steps are accomplished by solving for $I_{ref}^{RGB}$ and $I_{obj}^{RGB}$ a system of equations given by $$\begin{cases} I_{DC}^{RGB}(k) = I_{obj}^{RGB} + I_{ref}^{RGB} \\ M^{RGB}(k) = g^{RGB}(k)\sqrt{I_{obj}^{RGB} I_{ref}^{RGB}} \end{cases},$$

where k is acquisition frame, superscripts R, G and B refer to each of said wavelengths, $I_{DC}$ is said DC component of the irradiance data; and M(k) is estimated by the expression $[(I_{k+1}-I_{k-1})^2-(I_{k+2}-I_k)(I_k-I_{k-2})]^{1/2}$.

21. The method of claim 2, wherein said estimating step is accomplished by measuring said reference-surface contribution to said DC component of the irradiance data a priori and storing it for use in said subtracting step.

22. The method of claim 21, wherein said measuring step is carried out by measuring interference signals collected from a non-reflective object.

23. Non-transitory computer readable medium containing computer instructions stored therein for causing a computer processor to acquire irradiance data produced by multiple wavelengths at each pixel of a color detector receiving an interference irradiance; to process said irradiance data for each of said wavelengths to remove an interference component of the irradiance data and produce a DC component thereof; to estimate a reference-surface contribution to said DC component of the irradiance data; to subtract said reference-surface contribution from the DC component of the irradiance data to produce a sample-surface component thereof; and to combine said sample-surface component for each of said wavelengths received at pixels of the color detector corresponding to a predetermined area of the sample surface to produce a color image thereof.

24. The non-transitory computer readable medium of claim 23, wherein the medium is further encoded to combine said color image with a height map of the sample surface obtained from said interference irradiance measurements.

25. An interferometric method for producing a color image of a sample surface from interference irradiance measurements produced by white light, the method comprising the following steps:
acquiring irradiance data produced by multiple wavelengths at each pixel of a color detector receiving said interference irradiance, said irradiance data corresponding to scanning positions substantially outside a coherence envelope of said white light;
estimating a reference-surface contribution to said irradiance data;
subtracting said reference-surface contribution from the irradiance data to produce a sample-surface component thereof; and
combining said sample-surface component for each of said wavelengths received at pixels of the color detector corresponding to a predetermined area of the sample surface to produce a color image thereof;
wherein said acquiring, estimating, subtracting, and combining steps are carried out with a computer processor.

26. An interferometric method for producing a color image of a sample surface from interference irradiance measurements produced by white light, the method comprising the following steps:
providing an interferometer adapted to produce a reference beam and a sample beam of relative intensities such that the reference beam interferes with the sample beam with an intensity no greater than 50% of the sample beam intensity;
acquiring irradiance data produced by multiple wavelengths at each pixel of a color detector receiving said interference irradiance, said irradiance data corresponding to scanning positions substantially outside a coherence envelope of said white light; and
combining said irradiance data for each of said wavelengths received at pixels of the color detector corresponding to a predetermined area of the sample surface to produce a color image thereof;
wherein said acquiring and combining steps are carried out with a computer processor.

* * * * *